Patented Oct. 2, 1928.

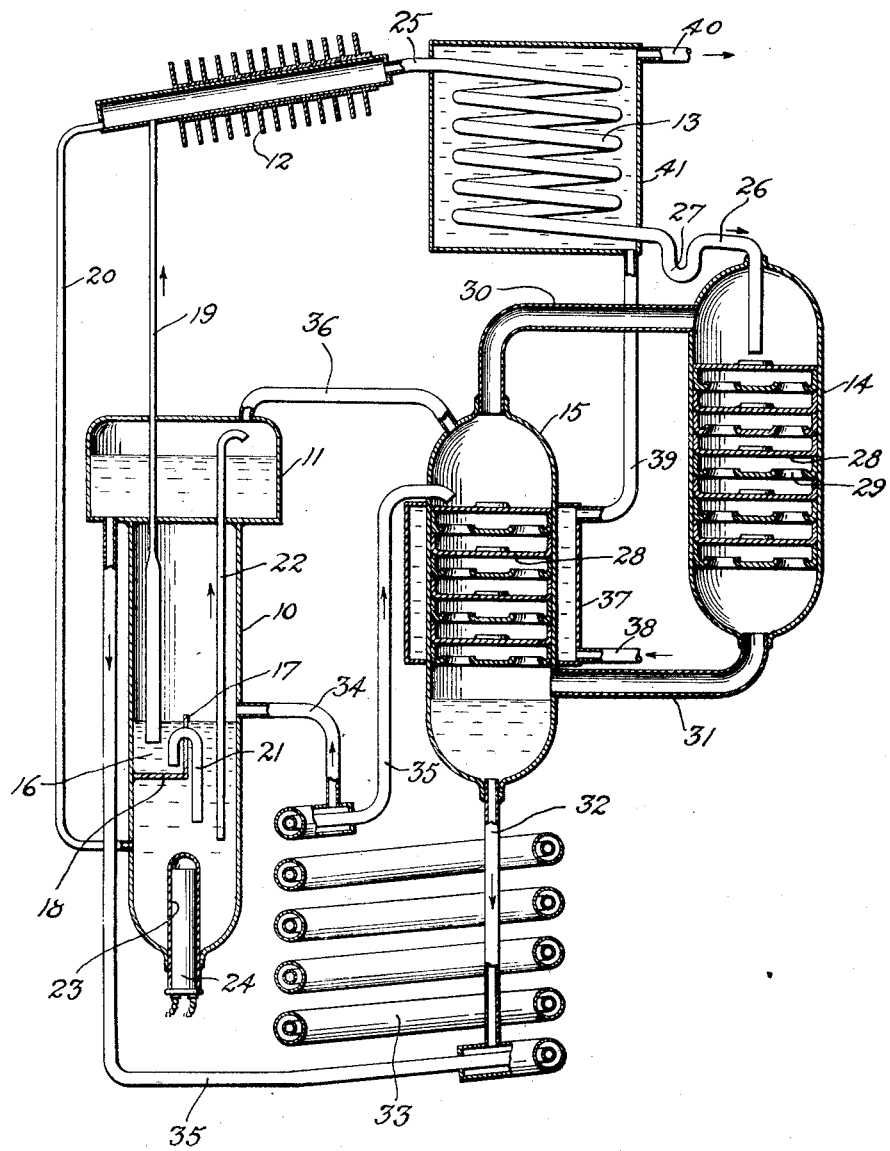

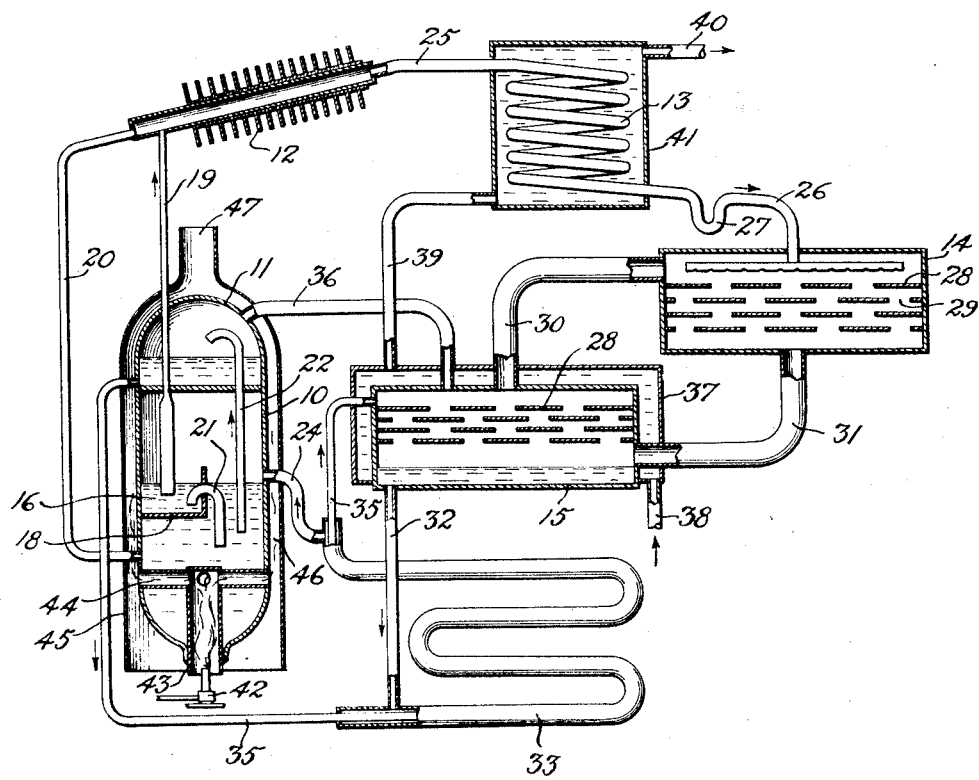

1,686,425

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

Application filed March 5, 1927, Serial No. 172,944, and in Sweden April 29, 1926.

The invention relates to absorption refrigerating systems and more particularly to systems wherein fluid is introduced, in the presence of which a refrigerant evaporates, the fluid being introduced for the purpose of equalizing pressure.

The invention has for its object to provide a novel refrigerating apparatus having a powerful circulation of fluids. In one preferred form it consists in an apparatus for forcing absorption liquid from a generator to a vessel situated at a higher level than the level of liquid in the generator during a period of operation in which the gas passage between the generator and the condenser is closed off.

The invention is apparent by reference to the embodiment thereof disclosed on the accompanying drawings wherein: Fig. 1 is an elevational, cross-sectional view showing a form of the invention applied to an absorption system for the production of refrigeration; and Fig. 2 shows a modified apparatus embodying the invention.

In Fig. 1, the absorption system includes a generator 10, a receiver 11, a rectifier 12, a condenser 13, an evaporator 14, and an absorber 15 which are interconnected by means of pipe conduits for circulation of fluids. The fluids contained within the system of Fig. 1, may be, for example, ammonia as a cooling agent or refrigerant, hydrogen as an auxiliary agent for equalizing pressure and distilled water as absorption liquid. Ammonia circulates through the generator, through the rectifier, through the condenser, through the evaporator, and through the absorber. Hydrogen circulates through the evaporator and through the absorber. Water with ammonia dissolved therein circulates through the absorber, through the generator and through the receiver. Within the generator is an isolated portion 16 which forms what may be termed a cup and is a vessel closed at the bottom and sides. In the circular generator as shown, this cup may be made by a diametrically disposed partition 17, a semi-circular bottom 18, and a portion of the generator shell, these parts being welded or otherwise united so that this cup may retain liquid although the remainder of the generator be emptied. A conduit 19 connects the cup with the rectifier. The upper end of this conduit opens into the rectifier and the lower end is posited within the cup. The rectifier is inclined and its lower end is connected by means of a conduit 20 with the lower portion of the generator. The upper portion of conduit 19 is a very small cross-section while its lower portion is of larger cross-section. The passageway through this conduit from the cup to the rectifier is thus relatively large to begin with and diminished further on toward the rectifier.

Cup 16 communicates with the liquid space proper of the generator through a siphon 21 having a short leg within the cup and a longer leg without the cup. A conduit 22 which may be termed a riser conduit extends from within the generator preferably at a point somewhat below the lowest point of siphon 21 to the upper part of receiver 11 where it terminates in a gooseneck bend. Conduit 22 is of larger minimum cross-section than conduit 19.

In the lower portion of the generator is a pocket 23 in which is situated a heating element 24 for causing boiling within the generator.

The rectifier is connected to the condenser by means of conduit 25. The condenser consists of a coil 13 posited within a water jacket 41. The lower end of coil 13 communicates with evaporator 14 through a conduit 26 in which is a U-seal 27. The evaporator is provided with a series of disks 28 having passages 29 through the same, which disks serve to hold and distribute liquid ammonia within the evaporator over a large surface for intimate contact with hydrogen introduced thereinto from the absorber. The evaporator disks may be equipped with smaller passageways for passage of liquid so that the passage of gas through the evaporator may be independent of the passage of liquid. The evaporator and absorber are connected to form a local circulatory cycle for hydrogen by means of conduits 30 and 31. Conduit 30 connects the upper part of the absorber with the upper part of the evaporator. Conduit 31 connects the lower part of the evaporator with the lower part of the absorber. The absorber also contains disks 28 to insure good gas and liquid contact.

A conduit 32 connects the lower portion of the absorber with the outer conduit 33 of a heat exchanger and a conduit 34 connects this outer conduit 33 with the generator, conduits 32, 33 and 34 constituting a passage for rich absorption liquid from the lower part of the absorber to the generator. A conduit 35 leaves the lower portion of receiver 11, passes through the heat exchanger by extending concentrically with and within conduit 33 and issues into the upper part of the absorber. The return conduit to the generator from the absorber including conduits 32, 33 and 34 extends downwardly to a distance below the level of liquid in the absorber at least equal to the height of riser conduit 22.

A gas conduit 36 connects the upper part of receiver 11 with the upper part of the absorber.

The operation of the system is as follows:

Assume that the level of liquid in the generator is, to begin with, about at the top of siphon 21 and that the pressure is practically constant throughout the system. Heat supplied by heating element 24 causes expulsion of ammonia from solution in the generator and formation of an excess pressure in the generator above that of the rest of the system. This pressure causes liquid to rise within conduits 19, 20, 22 and 32. These columns of liquid serve to balance the excess pressure generated. When the pressure has risen to the value such that the liquid column in riser conduit 22 has reached its highest point a period of liquid flow to receiver 11 begins. The pressure may then rise still further to an amount corresponding to the velocity head in riser conduit 22, whereupon liquid columns rise in conduits 19 and 20 to a height higher than the height of riser conduit 22 by an amount corresponding to this velocity head so long as liquid flows through conduit 22. During this operation the liquid level in the generator decreases and at the same time the liquid level in cup 16 decreases until the lower end of conduit 19 is opened to the vapor space of the generator. Even though the lower end of conduit 19 now is in communication with the vapor space of the generator, the liquid column within conduit 19 remains therein, so to speak, hanging in the conduit, on account of the diminished cross-section in the upper portion thereof.

While this liquid column is hanging in conduit 19 variations in pressure simply move this column. If the pressure rises this liquid column is moved upward within conduit 19. As it moves upwardly the upper part of the column rises a greater distance than the lower because of the reduction in cross-section, so that the whole liquid column expands to correspond with the higher pressure. Thus, this liquid column hangs in conduit 19 independently of small variations of pressure in the generator. On continued circulation, cup 16 is emptied, whereupon the liquid within the siphon passes into the lower part of the generator. When finally the lower opening of riser conduit 22 becomes free of liquid, a quantity of vapor passes into this conduit and the liquid within this conduit is forced up into receiver 11. At this moment there is formed an open communication between the generator and absorber through conduits 22 and 36, whereupon an equalization of pressure quickly takes place. During this period the liquid seal 27 prevents the passage of any gas from evaporator 14 through conduit 26 to condenser 13.

When the pressure is equalized, the liquid within conduit 19 falls down into cup 16 and conduit 19 thus becomes an open passage for vapor so that ammonia vapor within the generator can pass through conduit 19 and the rectifier 12 into the condenser 13 where it is liquefied by means of water circulating around the condenser. Any liquid in rectifier 12 passes back into the generator through conduit 20. The apparatus now operates as a refrigerator, the liquefied ammonia passing into the evaporator where it diffuses into hydrogen supplied thereto from the absorber through conduit 30. This diffusion causes a drop in temperature within evaporator 14 and refrigeration is produced. As the mixture of ammonia and hydrogen within evaporator 14 has a greater specific weight than the hydrogen which enters through conduit 30, the mixture passes downwardly around and through disks 28 situated within evaporator 14. These disks assist in the complete diffusion of the ammonia and the hydrogen within the evaporator.

The mixture passes out of the bottom of evaporator 14 through conduit 31 to the lower part of absorber 15. Here it is met by water which contains but relatively little ammonia in solution which passes downwardly over and through disks 28 within the absorber. This water flows by gravity from receiver 11 through conduit 35. The water absorbs the ammonia vapor while the hydrogen is unabsorbed and passes upwardly through the absorber and through conduit 30 to the upper part of evaporator 14 where it again diffuses into the ammonia entering through conduit 26. The heat developed by the absorption of the ammonia by the water is mostly carried away by the cooling water which circulates through water jacket 37. The cooling water is introduced into water jacket 37 through conduit 38 and is discharged through conduit 39 to water jacket 41 around condenser 13 and is finally discharged through conduit 40.

The solution of ammonia and water formed within absorber 15 passes out through conduit 32, heat exchanger 33 and conduit 34 to generator 10. In heat exchanger 33 the strong solution receives heat from the weak solution which passes through conduit 35. Within generator 10 the ammonia is again driven out of solution by heat applied from heating element 24 and passes upwardly through conduit 19 and repeats its cycle.

However, during this period of refrigeration the solution of ammonia in water enters generator 10 and only ammonia vapor leaves the generator. Hence the level of the liquid within generator 10 will rise until it has reached the highest point of siphon 21. Thereupon cup 16 is quickly filled and the lower end of conduit 19 is submerged. The pressure now starts to build up in generator 10 as previously described.

The relative lengths of the alternate periods depend upon the relative diameter of conduit 22 and the smallest diameter of conduit 19. The larger the diameter of conduit 22 relative to the smallest diameter of conduit 19, the longer will be the period of gas passage from the generator to the evaporator relative to the period of closure by the liquid column in conduit 19.

By suitably dimensioning the conduits, receiver 11 may be made to function as an accumulator and to maintain, to a greater or less degree, an equalized flow of liquid to absorber 15.

Fig. 2 shows the adaptation of the invention to a system employing a shallow evaporator and absorber. The apparatus is similar to that shown in Fig. 1 with the exception that the evaporator and absorber instead of being tall narrow vessels are shallow and broad. The shortness of absorber 15 makes it preferable, in order to obtain sufficient heat transfer surface, to extend water jacket 37 over the top thereof as well as around the sides. Generator 10 is shown as heated by a gas burner 42. Burner 42 is placed near the bottom of a flue 43 which extends some distance into generator 10. The top of flue 43 communicates with the annular space 46 formed between the outer shell of generator 10 and shell 45 by means of one or more passageways 44. The gases of combustion are finally discharged from space 46 through opening 47 which is formed in the top of shell 45.

The operation of the apparatus shown in Fig. 2 is similar to that of the apparatus shown in Fig. 1 and will be fully understood by reference to the description of Fig. 1.

While we have shown the invention as applied to preferred apparatus, it is to be understood that the invention is not limited to the form of apparatus shown and described.

Having thus described our invention, what we claim is:

1. That improvement in the art of refrigeration through the agency of an absorption system including a generator and an absorber which consists in alternately and periodically producing flow of weak absorption liquid in direction from the generator to the absorber due to pressure and gravity and periodically producing flow of strong absorption liquid in direction from the absorber to the generator due to gravity.

2. That improvement in the art of refrigerating through the agency of an absorption system including a generator and an absorber which consists in periodically producing a rise of pressure in the generator, periodically lifting weak absorption liquid from the generator to a relatively high level with respect to said absorber due to said rise of pressure and producing flow of said liquid from the elevated position to the absorber by gravity while continuously applying heat to the generator.

3. In an absorption refrigerating apparatus, a generator, an evaporator, a conduit connecting said generator with said evaporator, means to generate pressure in said generator to vary the level of liquid therein, said conduit being so arranged that variation of liquid in the generator opens and closes the generator end of said conduit, an absorber, a receiver situated at a high level relative to said generator and absorber, a conduit connecting said generator with said receiver adapted to be in alternate communication with the gas and liquid spaces of the generator due to variation of liquid level in the generator, and fluid connections between the receiver and absorber and absorber and generator.

4. That improvement in the art of refrigerating through the agency of an absorption system including a generator for producing a gaseous cooling agent to be condensed and evaporated, said generator containing a main body of solution of the cooling agent in an absorption liquid, means for condensing the cooling agent, an evaporator for evaporating the cooling agent, an absorber containing absorption liquid for absorbing the cooling agent, the aforesaid parts being interconnected for circulation of fluid therethrough, which consists in periodically closing communication between the generator and evaporator, generating an excess pressure during the period of closed communication and circulating absorption liquid due to said excess pressure.

5. That improvement in the art of refrigerating through the agency of an absorption system including a generator for producing a gaseous cooling agent to be condensed and evaporated, said generator containing a main body of solution of the cooling agent in an absorption liquid, means for condensing the cooling agent, an evaporator for evaporating the cooling agent, an absorber containing absorption liquid for absorbing the cooling agent, the aforesaid parts being interconnected for circulation of fluid therethrough, which consists in periodically forming a liquid column to close communication between the generator and evaporator, generating an excess pressure during the period of closed communication and circulating absorption liquid due to said excess pressure.

6. That improvement in the art of refrigerating through the agency of an absorption system including a generator for producing a gaseous cooling agent to be condensed and evaporated, said generator containing a main body of solution of the cooling agent in an absorption liquid, means for condensing the cooling agent, an evaporator for evaporating the cooling agent, an absorber containing absorption liquid for absorbing the cooling agent, the aforesaid parts being interconnected for circulation of fluid therethrough, which consists in periodically forming a liquid column to close communication between the generator and evaporator, generating an excess pressure in the generator during the period of closed communication and conducting absorption liquid from the generator to the absorber due to said excess pressure.

7. That improvement in the art of refrigerating through the agency of an absorption system including a generator, an evaporator and an absorber, interconnected for circulation of fluid therethrough, which consists in periodically forming a liquid column to close communication between the generator and evaporator, generating an excess pressure in the generator during the period of closed communication, lifting weak absorption liquid from the generator to a level permitting flow by gravity to the absorber due to said excess pressure, and conveying absorption liquid to the absorber.

8. Absorption refrigerating apparatus comprising a generator, a receiver situated above said generator, means to heat said generator, a cup within said generator forming a separate liquid space therein, a conduit opening within said cup and extending upwardly therefrom, a siphon having one leg opening into said cup and the other leg opening within the liquid space of the generator at a lower level than said cup and a conduit connecting the liquid space of said generator with said receiver.

9. Absorption refrigerating apparatus comprising a generator, a cup within said generator forming a separate liquid space therein, a conduit opening into said cup and extending upwardly therefrom and having a restricted portion adapted to suspend a column of liquid therein, means to supply liquid to said generator and means for quickly filling said cup upon rise of liquid in said generator above a predetermined level.

10. Absorption refrigerating apparatus comprising a generator, an evaporator, a receiver, means involving alternately raising and lowering pressure to periodically lift absorption liquid from said generator to said receiver comprising a conduit for passage of vapor from the generator to the evaporator adapted to suspend a column of liquid therein, and means to liquefy vapor in its passage from the generator to the evaporator.

11. Absorption refrigerating apparatus comprising a generator, a rectifier, an evaporator, a receiver and means involving alternately raising and lowering pressure in the generator to periodically lift absorption liquid from said generator to said receiver, said means including a conduit connecting said generator with said rectifier for passage of vapor therethrough and adapted to suspend a column of liquid therein.

12. Absorption refrigerating apparatus comprising a generator, a rectifier, an evaporator, a receiver, means involving alternately raising and lowering pressure in the generator for periodically lifting absorption liquid from said generator to said receiver including a conduit extending from within said generator to said rectifier and adapted to suspend a column of liquid therein and a return conduit from said rectifier to said generator.

13. Absorption refrigerating apparatus comprising a generator, an absorber, an evaporator, a receiver and means for periodically lifting absorption liquid from said generator to said receiver including a conduit having an open end in said generator adapted to be closed by liquid and being restricted in order to suspend a column of liquid therein and a conduit connecting said generator with said receiver, the last mentioned conduit having an opening in the generator at a lower level than the restricted conduit.

14. Apparatus according to claim 13 wherein the last mentioned conduit is of smaller minimum cross-section than the restricted conduit.

15. Absorption refrigerating apparatus comprising a generator, an absorber, a receiver, means involving alternately raising and lowering pressure in the generator to periodically lift absorption liquid from said generator to said receiver including a riser conduit and a conduit adapted to alternately contain liquid and gas for conducting absorption liquid from said absorber to said generator, the last mentioned conduit being extended downwardly below the absorber to a distance below the level of liquid in the absorber at least as great as the length of said riser conduit.

16. That improvement in the art of refrigerating through the agency of an absorption system including a generator and an absorber which consists in periodically producing flow of absorption liquid from the generator to the absorber and accumulating liquid in varying volume in the path of flow to equalize the rate of flow of said liquid into the absorber.

17. That improvement in the art of refrigerating through the agency of an absorption system including a generator, a condenser, an evaporator and an absorber, interconnected for circulation of fluid therethrough, including flow of gaseous cooling agent from the generator to the condenser, which consists in periodically stopping flow of the gaseous cooling agent to the condenser, generating an excess pressure during the period when the flow of gaseous cooling agent to the condenser is stopped and circulating absorption liquid due to said excess pressure.

18. That improvement in the art of refrigerating through the agency of an absorption system including a generator, a condenser, an evaporator and an absorber, interconnected for circulation of fluid therethrough, including flow of gaseous cooling agent from the generator to the condenser, which consists in periodically forming a liquid column to stop flow of gaseous cooling agent to the condenser, generating an excess pressure in the generator during the period when said liquid column is formed and conducting absorption liquid from the generator to the absorber due to said excess pressure.

19. In an absorption refrigerating apparatus, a generator, an evaporator, a conduit connecting said generator with said evaporator, means to generate pressure in said generator to vary the level of liquid therein, said conduit being so arranged that variation of liquid in the generator opens and closes the generator end of said conduit, the generator end of said conduit being at a relatively high position of liquid level in the generator, an absorber, a receiver situated at a high level relative to said generator and absorber, a conduit connecting a relatively low point of said generator with said receiver adapted to be in alternate communication with the gas and liquid spaces of the generator due to variation of liquid leved in the generator and fluid connections between the receiver and absorber and absorber and generator.

20. Refrigerating apparatus comprising a generator, a condenser, an evaporator, an absorber, the aforesaid parts being arranged in communication for circulation of fluids including conduits between the absorber and evaporator for circulating an auxiliary gas in the presence of which the cooling agent evaporates, means to periodically produce a rise of pressure in the generator, means connected to a relatively low portion of the generator for lifting weak absorption liquid from the generator to a relatively high level with respect to said absorber due to said rise of pressure and means for permitting flow of absorption liquid by gravity from the elevated position to the absorber.

21. Refrigerating apparatus comprising a generator, a condenser, an evaporator, an absorber, the aforementioned parts being interconnected for flow of fluid including means for circulating an auxiliary agent through the absorber and evaporator in the presence of which a cooling agent evaporates and including a conduit for conducting vapor of the cooling agent from the generator toward the evaporator, means to periodically stop flow of vapor of the cooling agent through the last mentioned conduit and to generate an excess pressure during the period of stopping of flow of vapor through the said last mentioned conduit and means for circulating absorption liquid due to said excess pressure.

22. Refrigerating apparatus comprising a generator, a condenser, an evaporator, an absorber, the aforementioned parts being interconnected for flow of fluid including a conduit for conducting vapor of a cooling agent from the generator to the condenser and including connections for circulating an auxiliary agent through the evaporator in the presence of which the cooling agent evaporates, means to periodically form a liquid column to close communication between the generator and condenser through the first mentioned conduit and to generate an excess pressure during the period of closed communication between the generator and condenser and means to circulate absorption liquid due to said excess pressure.

23. That improvement in the art of refrigerating through the agency of an absorption system including a generator, an evaporator and an absorber interconnected for circulation of fluid therethrough, which consists in periodically removing liquid from the generator to form a liquid column for closing communication between the generator and evaporator, generating an excess pressure in the generator during the period of closed communication, conducting absorption liquid from the generator to the absorber due to said excess pressure and returning the liquid of the liquid column back to the generator to reopen communication between the generator and evaporator.

In testimony whereof we hereunto affix our signatures.

BALTZAR CARL von PLATEN.
CARL GEORG MUNTERS.